(12) United States Patent
Nishiyama

(10) Patent No.: US 7,827,415 B2
(45) Date of Patent: Nov. 2, 2010

(54) IMAGE PROCESSING APPARATUS CAPABLE OF AUTHENTICATING DOCUMENT

(75) Inventor: Yoko Nishiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1239 days.

(21) Appl. No.: 11/099,562

(22) Filed: Apr. 6, 2005

(65) Prior Publication Data

US 2007/0245145 A1    Oct. 18, 2007

(30) Foreign Application Priority Data

Apr. 8, 2004 (JP) ............................. 2004-114372
Mar. 31, 2005 (JP) ............................. 2005-102855

(51) Int. Cl.
*H04L 29/06* (2006.01)
*G06F 21/00* (2006.01)

(52) U.S. Cl. .......................... 713/193; 713/716; 726/26

(58) Field of Classification Search .................. None
See application file for complete search history.

(56) References Cited

U.S. PATENT DOCUMENTS

| 6,873,435 B1* | 3/2005 | Tehranchi et al. ............. 358/1.9 |
| 6,879,703 B2* | 4/2005 | Lin et al. ..................... 382/100 |
| 7,320,138 B2* | 1/2008 | Wakao et al. ................... 726/2 |
| 2002/0036780 A1* | 3/2002 | Nakamura .................... 358/1.2 |
| 2003/0221109 A1* | 11/2003 | Boyer et al. ................. 713/176 |
| 2004/0022411 A1* | 2/2004 | Tamaru et al. ............... 382/100 |
| 2004/0128511 A1* | 7/2004 | Sun et al. ..................... 713/176 |
| 2004/0128532 A1* | 7/2004 | Ohishi et al. ................. 713/200 |
| 2004/0236956 A1* | 11/2004 | Shen et al. ................... 713/193 |
| 2005/0021980 A1 | 6/2005 | Kanai |
| 2005/0160271 A9* | 7/2005 | Brundage et al. ............ 713/176 |

FOREIGN PATENT DOCUMENTS

| JP | 2000-287066 | 10/2000 |
| JP | 2002-49590 | 2/2002 |
| JP | 2003-198539 | 7/2003 |
| JP | 2004-096221 | 3/2004 |

* cited by examiner

*Primary Examiner*—Gilberto Barron, Jr.
*Assistant Examiner*—Abdulhakim Nobahar
(74) *Attorney, Agent, or Firm*—Oblon, Spivak, McClelland, Maier & Neustadt, L.L.P.

(57) ABSTRACT

An image processing apparatus is disclosed including a document data analysis unit and an authentication unit. The document data analysis unit can identify policy data related to the authentication of a document based on information related to a document and/or the type of the document, identify items in document data to be verified, conversion to be performed on data of the items, and verification information contained in the document data based on the identified policy data, and perform the identified conversion on data of the identified items. The authentication unit can authenticate the document based on the data on which the identified conversion is performed and the identified verification information.

13 Claims, 18 Drawing Sheets

FIG.6

| LIST OF CERTIFICATES |
|---|
| DOMICILIARY (COPY) |
| DOMICILIARY (ABRIDGED) |
| IDENTITY CARD |
| BIRTH CERTIFICATE |
| REAL ESTATE VALUE |
| ⋮ |

FIG.7

PULL-DOWN MENU
(SELECTING TYPE OF EMBEDDING,
FOR EXAMPLE)

(2)

| CERTIFICATE OF REAL ESTATE VALUE 2001 ||||||
| OWNER | ADDRESS | ASAHI-CHO 1-1, FUJISAWA-SHI ||||
|  | NAME | TARO FUJISAWA ||||
| LOCATION | CLASSIFICATION | SIZE m² | VALUE | NOTE ||
| ASAHI-CHO 1-1 | RESIDENTIAL | 100.000 | ¥10,000,000 | ....... ||
| ASAHI-CHO 1-2 | RESIDENTIAL | 50.00 | ¥7,000,000 | ....... ||
| ******* | ******* | ******* | ******* |  ||
|  |  |  |  |  ||
|  |  |  |  |  ||
| NOTE |||||

I certify that, to the best of my knowledge and belief, the statement of fact contained in this report is true and correct.

January 11, 2002

R. Yamamoto, Mayor-Fujisawa City (1)
SELECTION OF ITEMS TO BE VERIFIED

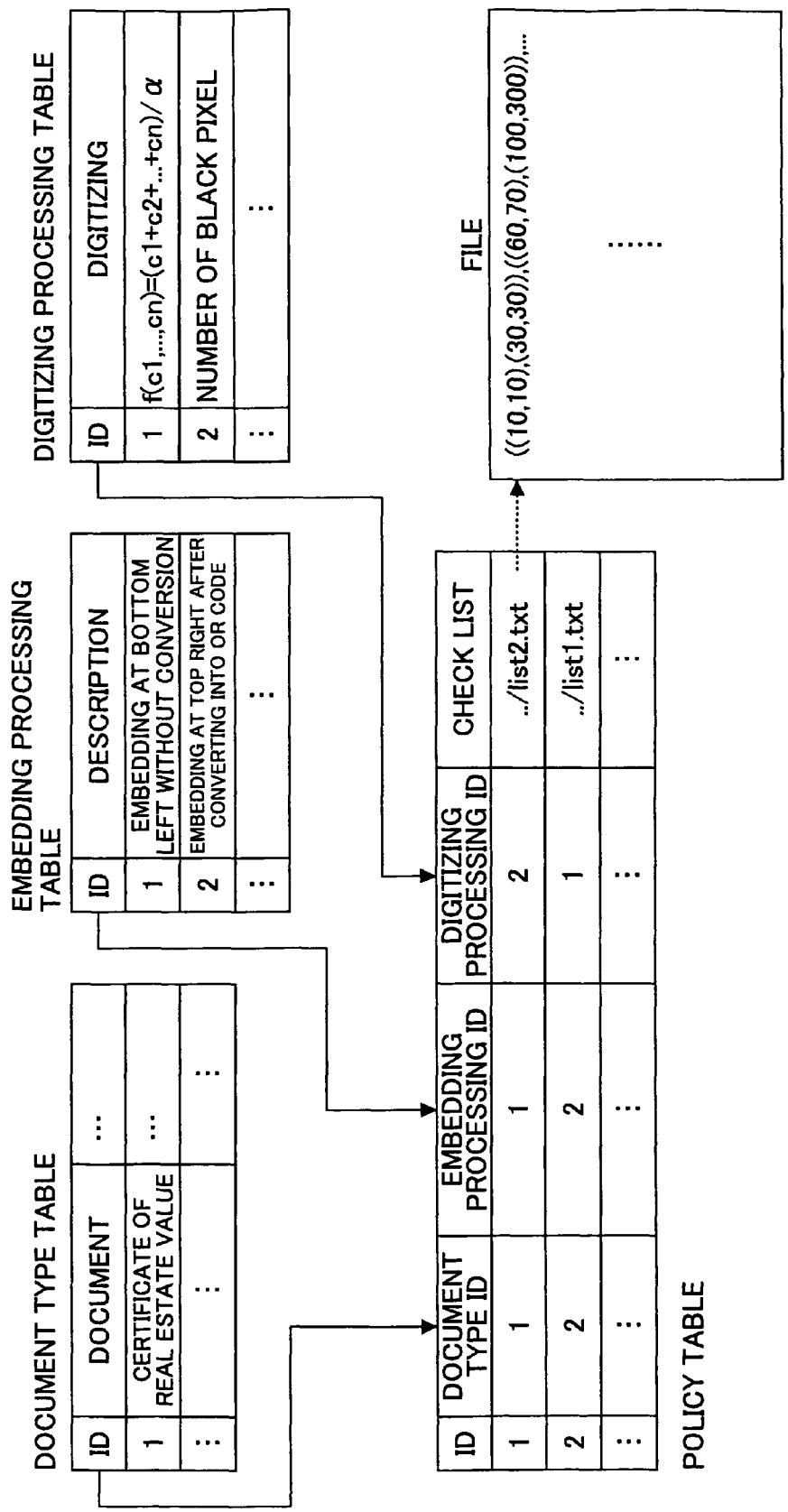

FIG.9

IDENTIFIER OF DOCUMENT TYPE — CERTIFICATE OF REAL ESTATE VALUE 2001

URI — 10

IDENTIFIER OF DOCUMENT — 19340

| OWNER | ADDRESS | ASAHI-CHO 1-1, FUJISAWA-SHI |
|---|---|---|
|  | NAME | TARO FUJISAWA |

| LOCATION | CLASSIFICATION | SIZE m² | VALUE | NOTE |
|---|---|---|---|---|
| ASAHI-CHO 1-1 | RESIDENTIAL | 100.000 | ¥10,000,000 |  |
| ASAHI-CHO 1-2 | RESIDENTIAL | 50.00 | ¥7,000,000 |  |
| ******** | ******** | ******** | ******** |  |
|  |  |  |  |  |
|  |  |  |  |  |

NOTE

I certify that, to the best of my knowledge and belief, the statement of fact contained in this report is true and correct.

January 11, 2002

*0342-6783-3365-3490-1364* ← VERIFICATION INFORMATION

R. Yamamoto, Mayor-Fujisawa City

FIG.11

RESULT OF AUTHENTICATION

CERTIFICATE OF REAL ESTATE VALUE 2001

OWNER  ADDRESS    ASAHI-CHO 1-1, FUJISAWA-SHI
       NAME       TARO FUJISAWA

| LOCATION | CLASSIFICATION | SIZE m² | VALUE | NOTE |
|---|---|---|---|---|
| ASAHI-CHO 1-1 | RESIDENTIAL | 100.000 | ¥10,000,000 | |
| ASAHI-CHO 1-2 | RESIDENTIAL | 50.00 | ¥7,000,000 | |
| ******** | ******** | ******** | ******** | |
| | | | | |
| | | | | |

NOTE

I certify that, to the best of my knowledge and belief, the statement of fact contained in this report is true and correct.
January 11, 2002

R. Yamamoto, Mayor-Fujisawa City

We certify that, to the best of my knowledge
and belief, the above statement is valid.

Notary Public_Fujisawa City
February 2, 2004 

IMAGE PROCESSING APPARATUS CAPABLE OF AUTHENTICATING DOCUMENT

BACKGROUND OF THE INVENTION

1. Field of the Invention

The present invention generally relates to the authentication of a document, and more particularly, to an image processing apparatus for and a method of authenticating a document.

2. Description of the Related Art

The prevalence of computers makes forgery and manipulation of paper documents relatively easy. It is desired that paper documents handed in by citizens and customers can be authenticated at the counter of public facilities and financial institutions, for example. The following Japanese Laid-Open Applications relates to the background of the invention: No. 2002-049590 and No. 2003-198539.

When a conventional system issues a paper document, however, the conventional system does not base on a policy indicating which portion of the paper document is used to authenticate the paper document. As a result, when the paper document is handed in, it is difficult to efficiently authenticate the paper document.

SUMMARY OF THE INVENTION

Accordingly, it is an object of the present invention to efficiently authenticate a document based on a policy. Another object of the present invention is to issue a document that can be efficiently authenticated based on a policy.

To achieve at least one of the above objects, an image processing apparatus according to an aspect of the present invention, includes:

a document data analysis unit configured to identify policy data related to the authentication of a document based on information related to a document and/or the type of the document, identify items in document data to be verified, conversion to be performed on data of the items, and verification information contained in the document data based on the identified policy data, and perform the identified conversion on data of the identified items; and an authentication unit configured to authenticate the document based on the data on which the identified conversion is performed and the identified verification information.

The document data analysis unit can identify policy data related to the authentication of a document based on information related to a document and/or the type of the document, identify items in document data to be verified, conversion to be performed on data of the items, and verification information contained in the document data based on the identified policy data, and perform the identified conversion on data of the identified items. The authentication unit can authenticate the document based on the data on which the identified conversion is performed and the identified verification information. Accordingly, the image processing apparatus can authenticate the document efficiently.

An image processing apparatus according to another aspect of the present invention includes:

a document data analysis unit configured to identify policy data related to the authentication of a document based on information related to a document and/or the type of the document, identify items in document data to be verified based on the identified policy data; and an authentication unit configured to authenticate the document based on the data to be verified and the identified verification information.

The document data analysis unit can identify policy data related to the authentication of a document based on information related to a document and/or the type of the document, identify items in document data to be verified based on the identified policy data. The authentication unit can authenticate the document based on the data to be verified and the identified verification information. Accordingly, the image processing apparatus can authenticate the document efficiently.

According to yet another aspect of the present invention, an image processing apparatus includes:

a policy data storage unit configured to store policy data for each document and/or type of the document; and a document generation unit configured to generate a document containing verification information by generating the verification information based on data of items to be verified and the stored policy data.

The policy data storage unit can store policy data for each document and/or type of the document, and the document generation unit can generate a document containing verification information by generating the verification information based on data of items to be verified and the stored policy data. Accordingly, the image processing apparatus can generate the document that can be efficiently authenticated based on the policy data.

According to yet another aspect of the present invention, an image processing apparatus includes:

a policy data setting unit configured to set policy data for each document and/or type of the document;

a document generation unit configured to generate a document; and an item data storage unit configured to store the data of the items to be verified used for the generation of the document by the document generation unit for each document and/or type of the document.

The policy data setting unit can set policy data for each document and/or type of the document; the document generation unit can generate a document; and the item data storage unit can store the data of the items to be verified used for the generation of the document by the document generation unit for each document and/or type of the document.

Other objects, features, and advantages of the present invention will become more apparent from the following detailed description when read in conjunction with the accompanying drawings.

BRIEF DESCRIPTION OF THE DRAWINGS

FIG. 6 illustrates a screen showing the list of documents according to an embodiment;

FIG. 7 illustrates a screen for setting policy according to an embodiment;

FIG. 8 illustrates the data structure of a policy data storage unit according to an embodiment;

FIG. 9 illustrates a document issued according to an embodiment;

FIG. 11 illustrates the result of authentication according to another embodiment;

DETAILED DESCRIPTION OF THE PREFERRED EMBODIMENTS

The preferred embodiments of the present invention are described in detail below.

First Embodiment

Figure 1:
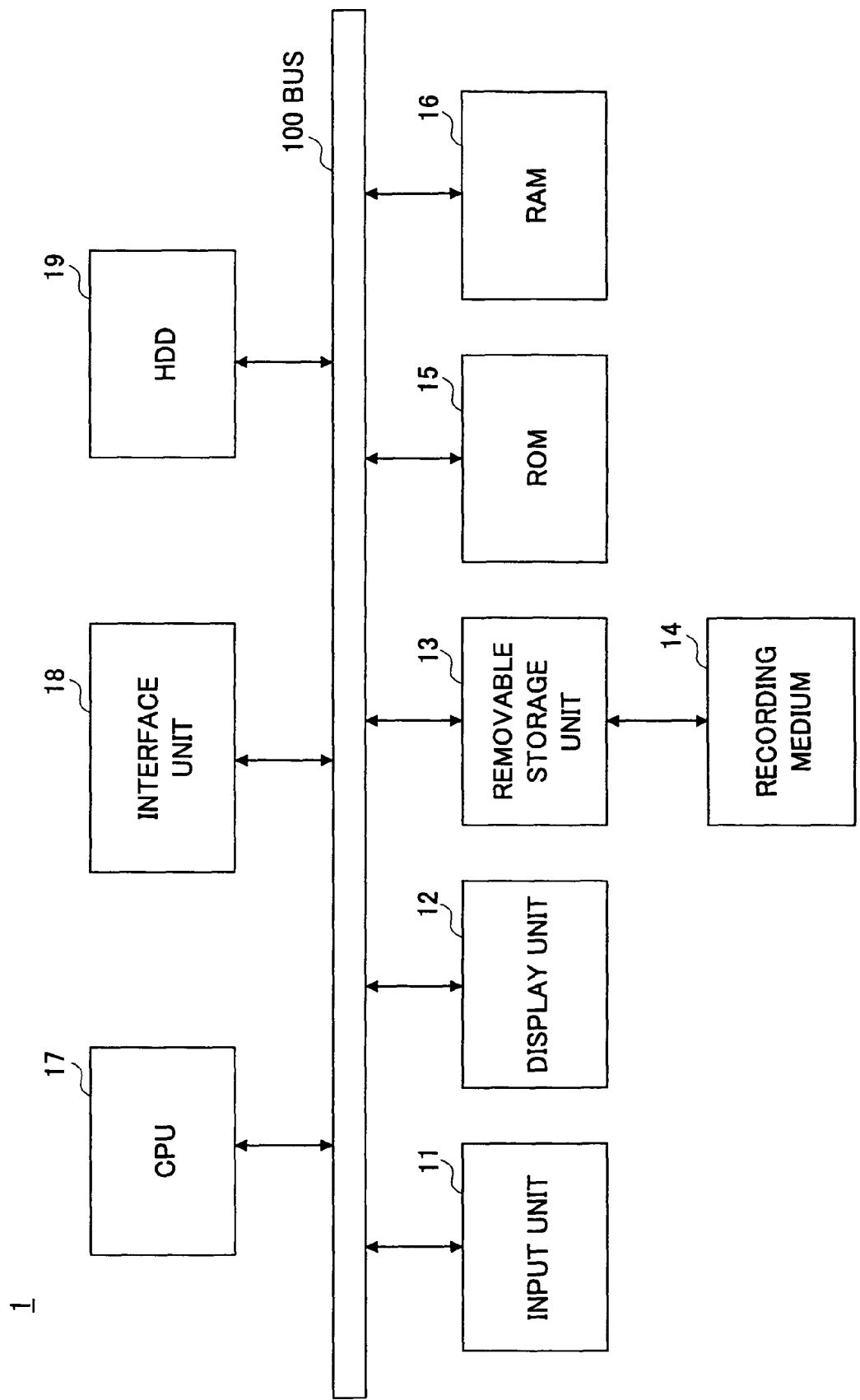
FIG. 1 illustrates the hardware construction of a server according to an embodiment.

The hardware construction of a server 1 is described with reference to FIG. 1. FIG. 1 illustrates the hardware construction of the server 1.

The server 1 includes an input unit 11, a display unit 12, a drive unit 13, Read Only Memory (ROM) 15, Random Access Memory (RAM) 16, Central Processing Unit (CPU) 17, an interface unit 18, and a Hard Disk Drive (HDD) 19, connected one another via a bus.

The input unit 11 includes a keyboard and/or a mouse that the user of the server 1 can operates to provide various information to the server 1. The display unit 12 includes a display that the user of the server 1, and displays various information. The interface unit 18 interfaces the server 1 to a network, for example.

For example, the server 1 can be provided with by reading a recording medium 14 such as a CD-ROM using the drive unit 13 or by downloading from the network. The recording medium 14 is set to the drive unit 13, and programs stored in the recording medium is installed to the HDD 19 via the drive unit 13.

ROM 15 stores data, for example. RAM 16 stores programs, for example, read from the HDD 19 when the server 1 is started. CPU 17 provides functions to be described below and performs processing as shown in flowcharts to be described below following the programs stored in RAM 16, for example, using ROM 15 and/or RAM 16.

Figure 2:
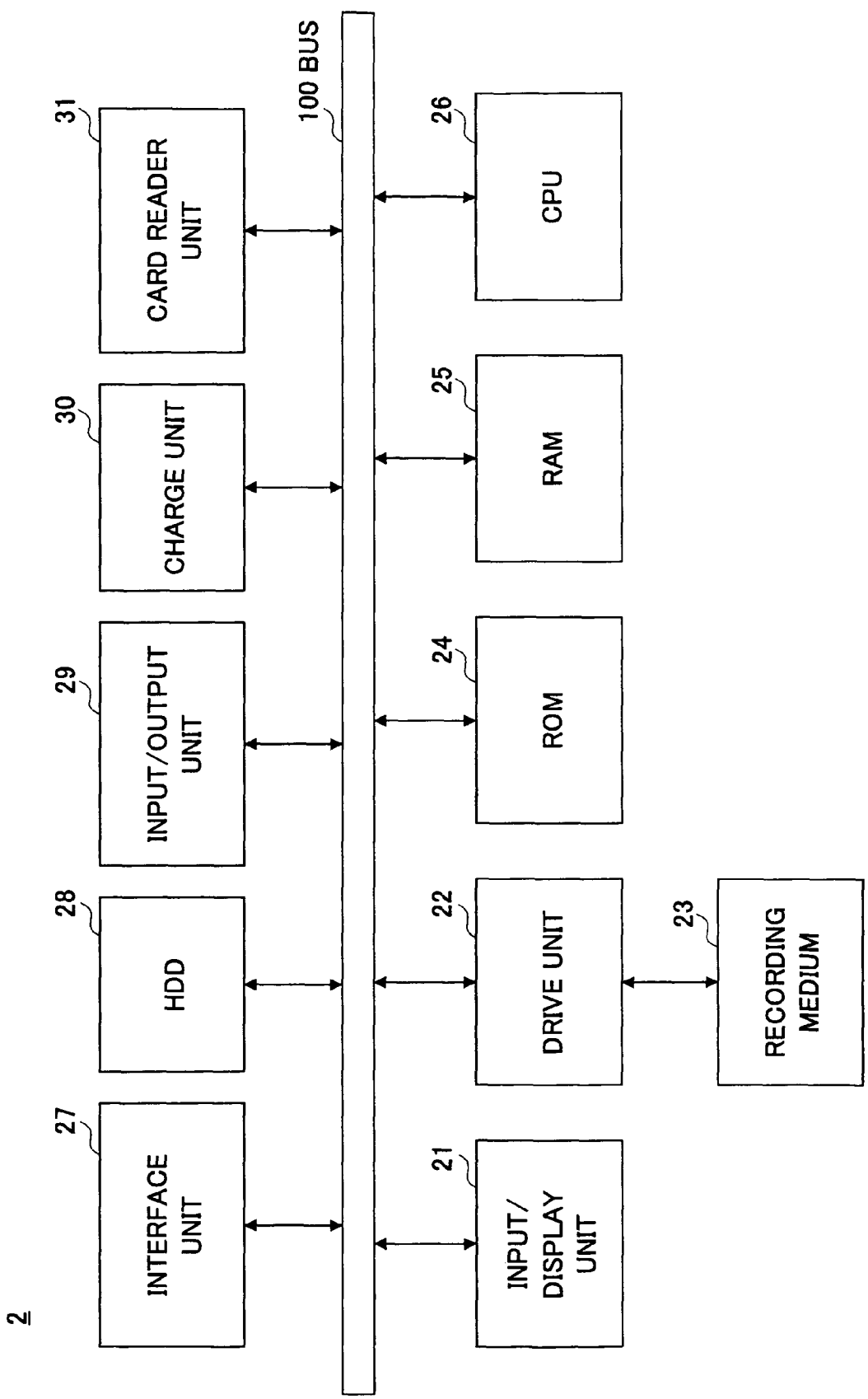
FIG. 2 illustrates the hardware construction of an image forming apparatus according to an embodiment.

The hardware construction of an image forming apparatus is described with reference to FIG. 2. FIG. 2 illustrates the hardware construction of the image forming apparatus 2.

The image forming apparatus 2 shown in FIG. 2 includes an input/display unit 21, a drive unit 22, ROM 24, RAM 25, CPU 26, interface 27, HDD 28, an input/output unit 29, a charging unit 30, and a card reader unit 31, connected each other via a bus.

The input/display unit 21 includes a touch panel, and is used for inputting various information to the image forming apparatus 2, and displaying various information to the user. In interface unit 27 interfaces the image forming apparatus 2 to the network, for example.

The image forming apparatus 2 is provided with programs by reading the recording medium 23 such as a CD-ROM using the drive unit 22, or by downloading from the network, for example. The recording medium 23 is set to the drive unit 22, and programs stored in the recording medium 23 is installed to HDD 28 via the drive unit 22.

ROM 24 stores data, for example. RAM 25 stores programs, for example, read from the HDD 28 when the image forming apparatus 2 is started. Following the programs, CPU 26 provides functions to be described below and performs processing as shown in flowcharts to be described below using ROM 24 and RAM 25.

The input/output unit 29 includes a scanner, a facsimile machine, a printer, and/or a copier which reads and prints a paper document.

The charge unit 30 includes a coin rack, for example, which receives paper money and coins from a user, and returns changes to the user. The card reader unit 31 includes an IC card reader and/or a prepaid card reader, for example, and reads an IC card and/or a prepaid card.

Figure 3:
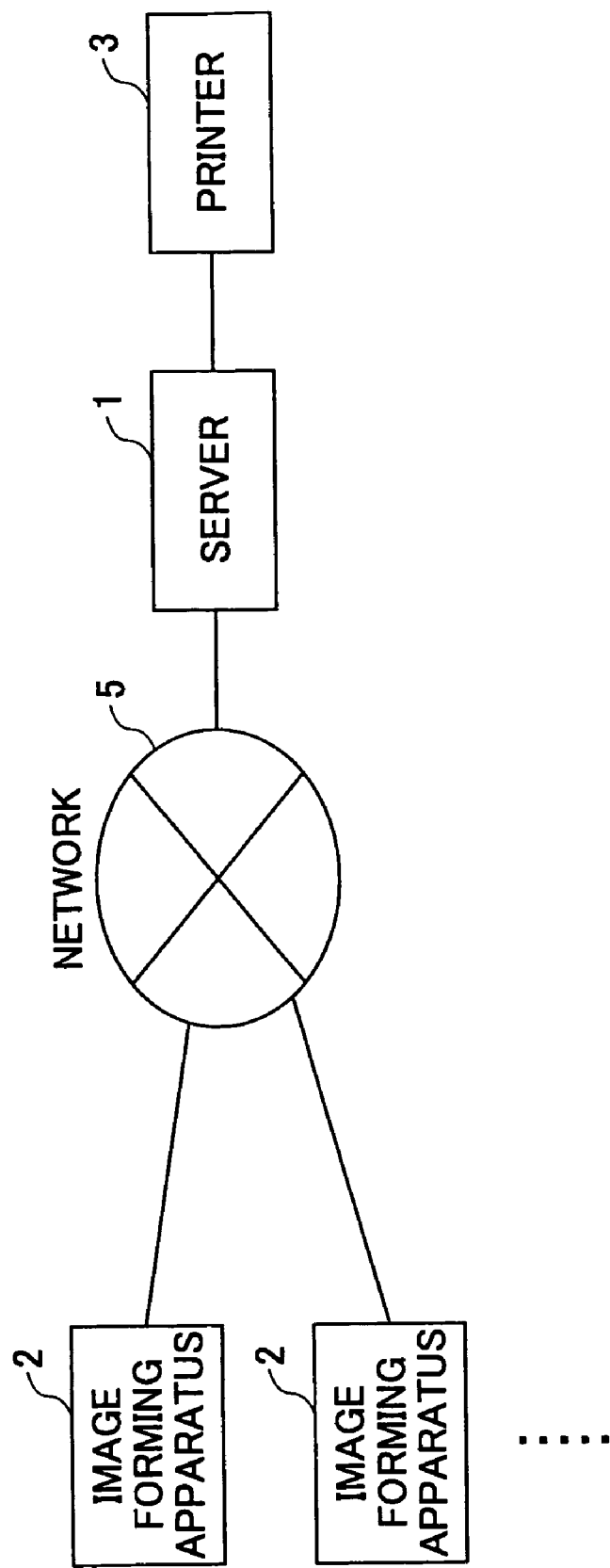
FIG. 3 illustrates a system according to an embodiment.

The system configuration is shown in FIG. 3. FIG. 3 is a system diagram showing the configuration of the system. The system shown in FIG. 3 includes the server 1, a printer 3 connected to the server 1 directly or via a network, and one or more image forming apparatus 2 connected to the server 1 via a network 5.

In response to receipt of a request from a user, the server 1 generates a document such as a certificate to be described below, and outputs the document using the printer 3. In an embodiment, the server may output the generated document using the image forming apparatus 2 instead of the printer 3.

In response to receipt of a request from the user, for example, the image forming apparatus 2 can read a paper document such as a certificate, determines whether the paper document is authentic, and provides the result of authentication to the user. The image forming apparatus 2 transmits data related to the read paper document to the server 1 via the network 5, obtains the result of authentication performed by the server 1, and presents the result of the authentication to the user.

The communication between the server 1 and the image forming apparatus 2 may be encrypted to improve the security of communication. According to the present and other embodiments, the communication between the server 1 and the image forming apparatus 2 may be performed using Simple Object Access Protocol (SOAP) based on extensible Markup Language (XML) and/or Hyper Text Transfer Protocol (HTTP).

Figure 4:
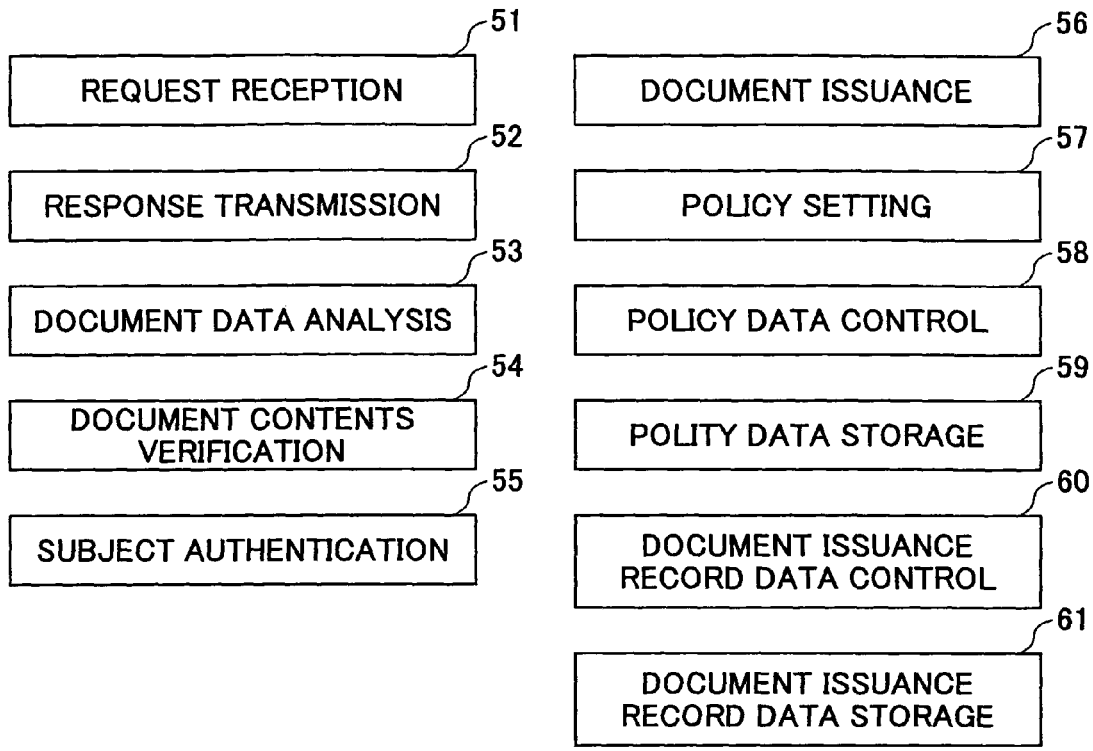
FIG. 4 illustrates the function of the server according to an embodiment.

The function of the server 1 is shown in FIG. 4. FIG. 4 illustrates the function of the server 1.

As shown in FIG. 4, the server 1 includes a request reception unit 51, a response transmission unit 52, a document data analysis unit 53, a document contents verification unit 54, an subject authentication unit 55, a document issuance unit 56, a policy setting unit 57, a policy data control unit 58, a policy data storage unit 59, a document issuance record data control unit 60, and a document issuance record data storage unit 61.

The request reception unit 51 receives a request for authentication containing the image data of the document from the image forming apparatus 2. The response transmission unit 52 transmits a response indicating the result of authentication performed by the document contents verification unit 54, for example, to the image forming apparatus 2. The document data analysis unit 53 analyzes the image data of the document. For example, the document data analysis unit 53 reads a Uniform Resource Identifier (URI) from the image data of the document data, identifies the policy for the-authentication of a document from the policy data storage unit 59, and further identifies items contained in the image data of the document used for the authentication.

The document contents verification unit 54 verifies the contents of the document thereby to authenticate the document. For example, the document contents verification unit 54 compares data of the items identified by the document data analysis unit 53 with corresponding data stored in the document issuance record data storage unit 61.

The subject authentication unit 55 authenticates the requestor who requests the authentication by determining the requestor being the same individual whose name is written on the document. The document issuance unit 56 issues documents as described with reference to FIG. 9. The policy setting unit 57 sets policy for each type of document (or for each document) in response to reception of a request from an administrator, for example. The policy data control unit 58 controls data related to policy stored in the policy data storage unit 59. For example, in response to receipt of a request from the policy setting unit 57, the policy data control unit 58 stores policy in the policy data storage unit 59. In response to receipt of a request from the document issuance unit 56 or the document data analysis unit 53, the policy data control unit 58 retrieves data related to policy from the policy data storage unit 59, and provides the data to the document issuance unit 56 and the document data analysis unit 53. The policy data storage unit 59 stores data related to policy. In the following description, policy is assumed to be set for each type of documents for simplicity. The data related to policy stored in the policy data storage unit 59 is described with reference to FIG. 8.

The document issuance record data control unit 60 controls data of items to be verified for each type of document, the data contained in a document generated by the server 1 and issued by the printer 5. The document issuance record data storage unit 61 stores data of items to be verified for each type of document, the data contained in a document generated by the server 1 and issued by the printer 5.

Figure 5:
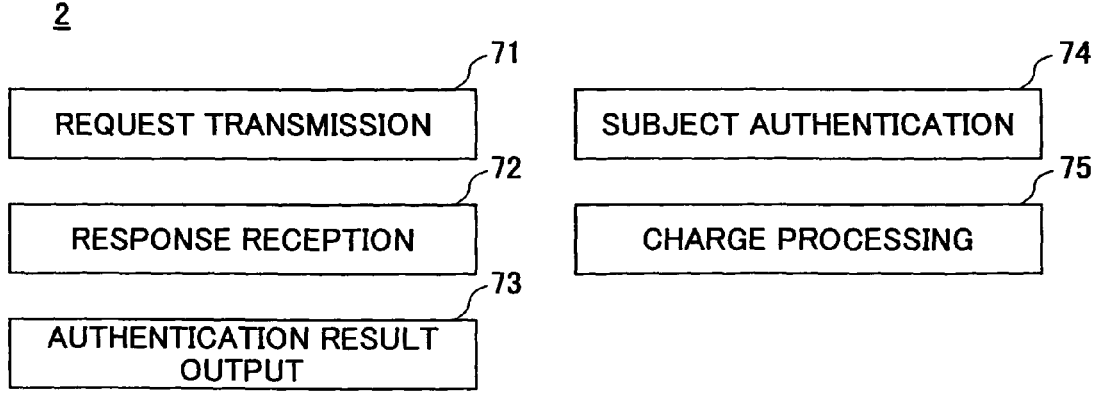
FIG. 5 illustrates the function of the image forming apparatus according to an embodiment.

The function of the image forming apparatus 2 is described with reference to FIG. 5. FIG. 5 illustrates the function of the image forming apparatus 2 according to an embodiment.

As shown in FIG. 5, the image forming apparatus 2 includes a request transmission unit 71, a response reception unit 72, an authentication result output unit 73, an subject authentication unit 74, and a charge processing unit 75.

The request transmission unit 71 transmits a request for authentication containing the image data of a document to the server 1. The image forming apparatus 2 uses the input/output unit 29 to read the image data of a document. The response reception unit 72 receives a response indicating the result of authentication from the server 1. The authentication result output unit 73 outputs the result of authentication by displaying the result of authentication on the touch panel of the image forming apparatus 2 or by printing the result of authentication on a sheet of paper.

The subject authentication unit 74 requests the user to input data based on which the authentication is performed. The charge processing unit 75 requests the user to pay charge of the authentication, and checks whether the charge has been inserted.

An example in which an administrator of the server 1 sets policy for each document type is described below with reference to FIGS. 6 and 7. FIG. 6 illustrates an exemplary screen of the list of documents.

The administrator of the server 1 causes the server to display the screen of the list of documents, and selects a document for setting policy thereof.

An exemplary screen for setting policy is shown in FIG. 7. FIG. 7 illustrates an screen for setting policy.

The administrator of the server 1 causes the server 1 to display the document selected using the screen showing the list of documents, and selects items which are verified for the authentication with reference to the screen for setting policy (indicated as (1) in FIG. 7). The user further causes the server 1 to display pull-down menu by right clicking, and selects the method of digitizing the selected items and the method of embedding the digitized data of the selected items in the document.

Digitizing may be performed by using a function such as $$si=f(C1, C2, \ldots, Cn),$$

where "si" is the verification information, and $C1, C2, \ldots, Cn$ are the character codes of characters written in the items to be verified. Another example of function is $$si=g(di),$$

where di is the number of black pixels included in the image in the item to be verified of document to be authenticated.

The verification information can be embedded in the document in various ways. For example, the verification information may be embedded without any conversion at a predetermined position (lower left portion, for example) of the document. Alternatively, the verification information may be embedded after converting it into a bar code or a QR code, for example, at a predetermined position of the document. The verification information may be embedded as a watermark on the document. A single item may be verified, but preferably multiple items may be verified for more accurate authentication.

The data structure of policy data set in accordance with the method described with reference to FIGS. 6 and 7 and stored in the policy data storage unit 59 is shown in FIG. 8. FIG. 8 illustrates an example data structure of the policy data storage unit 59.

As shown in FIG. 8, the policy data storage unit 59 includes a document type table, an embedding processing table, a digitizing processing table, and a policy table.

The document type table has an ID column, and a document column, for example. The ID column indicates the identifier of type of documents for identifying respective documents. The document column indicates the name of documents types.

The embedding processing table has an ID column and a description column, for example. The ID column indicates the identifier of the embedding processing for identifying respective methods for embedding verification information. The description column indicates whether and how the verification information is converted and where in the document the verification information is embedded.

The digitizing processing table has an ID column and a digitizing column. The ID column indicates the identifier for identifying each method of digitizing the verification data.

The digitizing column indicates the method of digitizing the verification information (for example, a function used for digitizing).

The policy table has an ID column, a document type ID column, an embedding processing ID column, a digitizing processing ID column, and a check list column, for example. The ID column indicates the identifier for identifying the policy. The document type ID indicates the identifier for identifying the type of documents. The embedding processing ID column indicates the identifier for identifying the embedding processing. The digitizing processing ID column includes the identifier for identifying the digitizing processing. The check list column includes a path to a file in which coordinates of the items to be verified is stored. The coordinates of the items to be verified instead of the path to the file may be stored in the check list column. In the case of the present embodiment, it is not necessary that the policy data storage unit 59 includes all tables shown in FIG. 8. For example, the policy data storage unit 59 according to the present embodiment may not include the embedding processing table and/or the digitizing processing table. In the following description, however, it is assumed that the policy data storage unit 59 includes all the tables shown in FIG. 8 for simplicity.

An exemplary generation of a document is described below with reference to FIG. 9. FIG. 9 illustrates an exemplary generation of a document according to an embodiment.

In response to receipt of a request for issuance of a document from a user, for example, the server 1 designates a URI of the document containing the identifier of document type and the identifier of document.

The server 1 refers to the policy table stored in the policy data storage unit 59, for example, and digitize verification information. The server 1 further embeds the digitized verification information, and print the document using the printer 3, for example. In the example shown in FIG. 9, the server 1 embeds the digitized verification information as is at the lower bottom position of the document.

Figure 10:
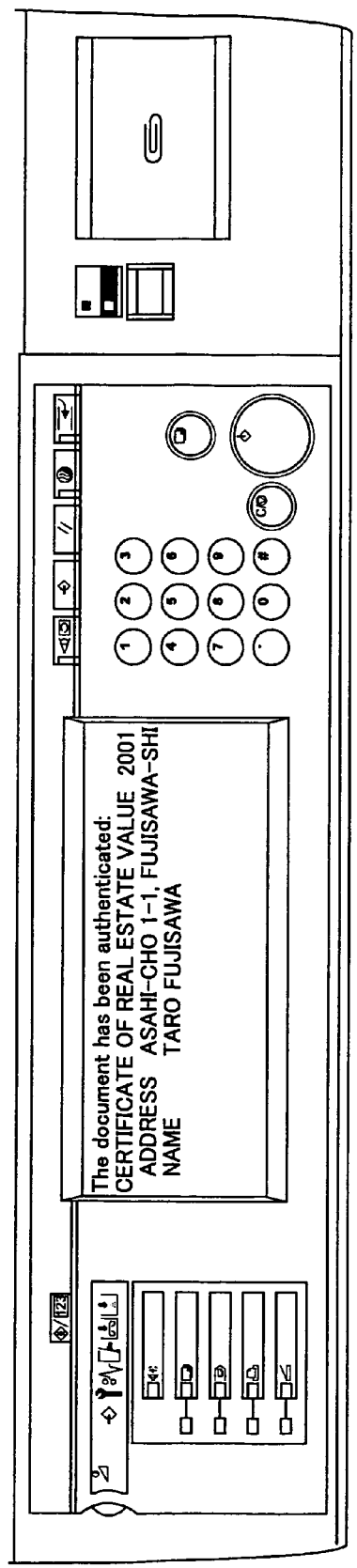
FIG. 10 illustrates the result of authentication according to an embodiment.

An exemplary presentation of authentication result obtained by authenticating such a document as shown in FIG. 9 is shown in FIGS. 10 and 11.

The image forming apparatus 2 reads the document shown in FIG. 9, foe example, and transmits a request for authentication to the server 1. When the image forming apparatus 2 receives a response indicating the authentication result corresponding to the request from the server 1, the image forming apparatus presents the authentication result contained in the response to the user.

An exemplary screen showing the authentication result displayed on the touch panel of the image forming apparatus 2 is shown in FIG. 10. FIG. 10 illustrates an exemplary screen showing the authentication result. As shown in FIG. 10, the image forming apparatus 2 may display the authentication result on the touch panel for the user.

FIG. 11 illustrates an exemplary authentication result printed on paper. As shown in FIG. 11, the image forming apparatus 2 may print the authentication result on paper, for example, for the presentation to the user.

The image forming apparatus 2 may switch between the presentation on the touch panel as shown in FIG. 10 and the presentation on paper as shown in FIG. 11 in dependence on the instruction from the user. Alternatively, the image forming apparatus 2 may present the authentication result either on the touch panel or on paper in dependence on setting.

Figure 12:
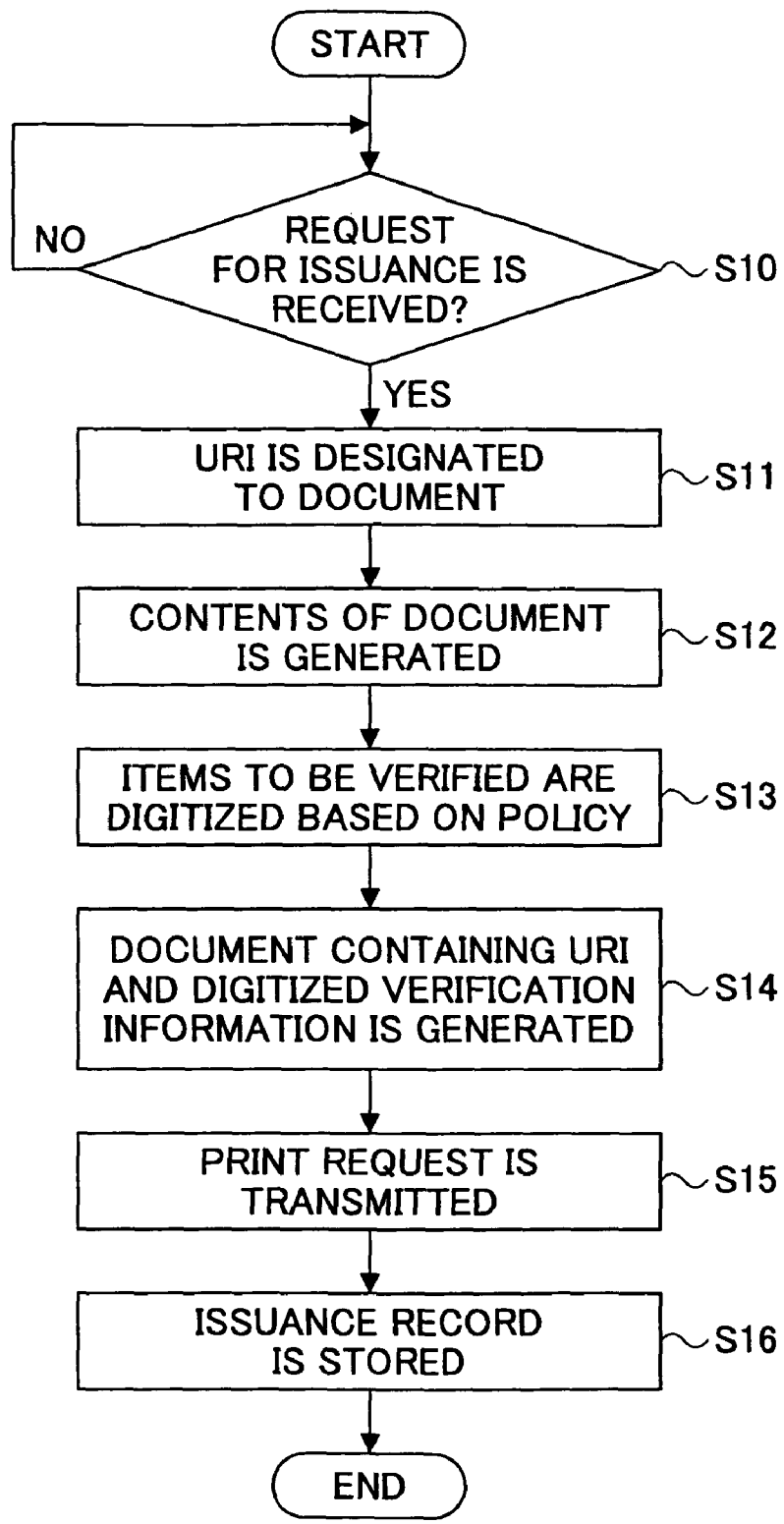
FIG. 12 is a flowchart showing the issuance of a document by the server according to an embodiment.

FIG. 12 is a first flowchart showing an exemplary issuance of a paper document by the server 1.

In step S10, the server 1 determines whether a request for the issuance of a document has been received. If the server 1 determines that a request for the issuance of a document has been received from a user, for example (YES in step S10), the process proceeds to step S11, otherwise (NO in step S10), returns to step S10.

In step S11, the server designates a URI to the document. Subsequent to step S11, in step S12, the server 1 generates the contents of the document in dependence on the type of the document. In the case of the certificate of real estate value shown in FIG. 9, the contents of the document may include the name and address of the owner, and the location and value of the owner's real estate.

Subsequently to step S12, in step S13, the server 1 digitizes data of the items to be verified (verification information) in accordance with the policy set for each type of document.

Subsequently to step S13, in step S14, the server 1 generates the document in which the URI designated in step S11 and the verification information digitized in step S13 are embedded.

Subsequently to step S14, in step S15, the server 1 transmits a request for printing the document generated in step S14 to the printer 3, for example.

In step S16, the server 1 stores issuance record containing the contents of the document issued (the name and address of the owner, for example), the designated URI, the items to be verified, the digitized verification information, and the date of issuance, for example, in the document issuance record data storage unit 61.

Following the process as shown in FIG. 12, the image forming apparatus 2 can generate, print, and present the document as shown in FIG. 9. It is noted that, as will be appreciated below, in the case of the first embodiment, the verification information may not need to be embedded in the document. That is, in the case of the first embodiment, steps S13 and S14 may not be performed.

Figure 13:
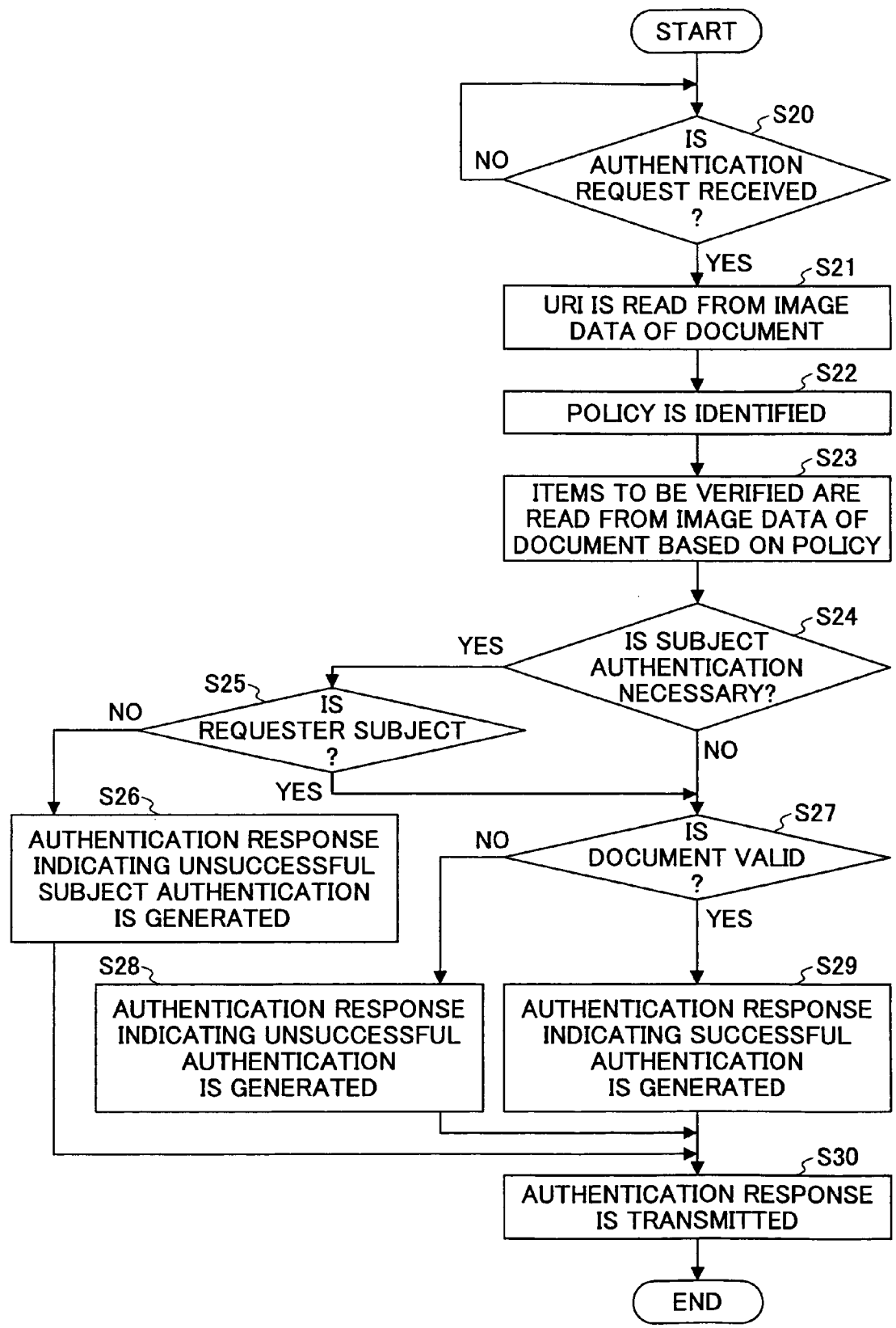
FIG. 13 is a flowchart showing the authentication of a document by the server according to an embodiment.

An exemplary authentication performed by the server 1 is described below with reference to FIG. 13. FIG. 13 is a first flowchart showing an exemplary authentication performed by the server 1.

In step S20, the server 1 determines whether a request for authentication has been received from the image forming apparatus 2. If the server 1 determines that a request for authentication has been received (YES in step S20), the process proceeds to step S21. Otherwise (NO in step S20), the process returns to step S20.

In step S21, the server 1 reads the URI embedded in the document from the image data of the document included in the authentication request received in step S20.

Subsequently to step S21, in step S22, the server 1 identifies the policy (or data related to the policy) by retrieving it from the policy data storage unit 59, for example, based on the URI read in step S21.

Subsequently to step S22, in step S23, the server 1 reads the items to be verified from the image data of the document included in the authentication request received in step S20 in accordance with the policy identified in step S22.

Subsequently to step S23, in step S24, the server 1 determines whether subject authentication is necessary. If the server 1 determines that the subject authentication is necessary (YES in step S24) the process proceeds to step S25. Otherwise (No in step S24), the process proceeds to step S27.

In step S25, the server 1 determines whether the requesting person is the subject of the document by comparing individual authentication data contained in the authentication request received in step S20 and the name in the contents of the document stored in the document issuance record data storage unit 61 accessible based on the URI. If the server 1 determines that the requesting person is the subject of the document (YES in step S25), the process proceeds to step S27, and otherwise (NO in step S25) the process proceeds to step S26.

In step S26, the server 1 generates a authentication response indicating that, for example, the subject authentication has failed, and the process proceeds to step S30. On the other hand, in step S27, the server 1 determines whether the document is authentic and valid by comparing the items to be verified read in step S23 and the data of the same items stored in the document issuance record data storage unit 61 as the issuance record accessed based on the URI. If the server 1 determines that the document is authentic and valid (YES in step S27), the process proceeds to step S29, and otherwise (NO in step S27) the process proceeds to step S28.

In step S28, the server 1 generates a authentication response indicating that, for example, the authentication has failed, and proceeds to step S30. In step S29, the server 1 generates an authentication response indicating that, for example, the authentication has succeeded, and proceeds to step S30.

In step S30, the server 1 transmits the authentication response to the image forming apparatus 2, for example, that has requested the authentication.

The server 1 can authenticate the document requested by the image forming apparatus 2, and return the authentication result to the image forming apparatus 2. According to the above arrangements, if the server 1 stores and retains at least the items to be verified in a manner in which the data is accessible through the URI, for example, the server 1 can authenticate the document. The server 1 does not need to retain the image data of the entire document.

Figure 14:
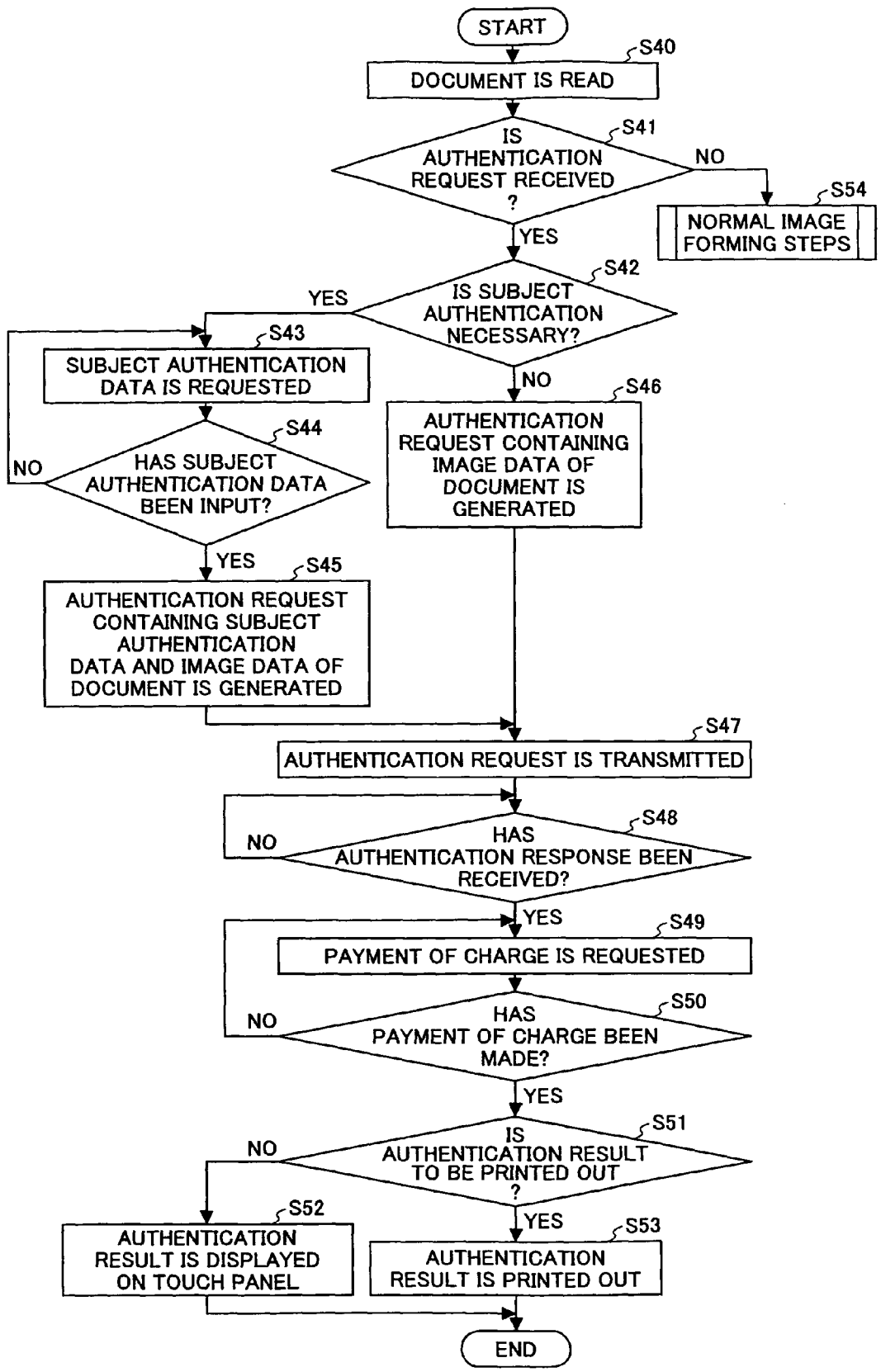
FIG. 14 is a flowchart showing the authentication of a document by the image forming apparatus according to an embodiment.

An exemplary authentication by the image forming apparatus 2 is described with reference to FIG. 14. FIG. 14 is a first flowchart showing the authentication process performed by the image forming apparatus 2. The image forming apparatus 2, for example, starts the following process when the document is set on the input/output unit 29 and a start button of the input/display unit 21 is pressed.

In step S40, the image forming apparatus 2 reads the document set on the input/output unit 29, and acquires the image data of the document. Subsequently to step S40, in step S41, the image forming apparatus 2 determines whether an authentication request has been received from a user, for example. If the image forming apparatus 2 determines that an authentication request has been received (YES in step S41), the process proceeds to step S42. Otherwise (NO in step S41), the process proceeds to step S54.

If the image forming apparatus 2 determines that the user has pressed a button for requesting the authentication of the document set on the input/display unit 21 before the start button is pressed, the image forming apparatus 2 determines that the authentication of the document has been requested. Otherwise (NO in step S41), the image forming apparatus 2 performs normal image forming such that the document set in the input/output apparatus 29 is read and duplicated, for example in step S54.

On the other hand, in step S42, the image forming apparatus 2 determines whether the subject authentication is necessary. If the image forming apparatus 2 determines that the subject authentication is necessary (YES in step S42), the process proceeds to step S43. Otherwise (NO in step S42), the process proceeds to step S46.

In step S43, the image forming apparatus 2 requests the user to input data required for the subject authentication. For example, the image forming apparatus 2 displays a screen on the touch panel for requesting the input of user name and a password thereby to request the user to input the user name and the password. The image forming apparatus 2 may display a screen on the touch panel for requesting the insertion of an IC card in which the individual authentication data is stored thereby to request the user for the insertion of the IC card.

Subsequently to step S43, in step S44, the image forming apparatus 2 determines whether the individual authentication data has been input or not. If the image forming apparatus 2 determines that the individual authentication data has been input (YES in step S44), the process proceeds to step S45. Otherwise (NO in step S44), the process proceeds to step S43.

In step S45, the image forming apparatus 2 generates an authentication request containing the individual authentication data input in step S43 and the image data of the document acquired in step S41, and the process proceeds to step S47.

On the other hand, the image forming apparatus 2 generates the authentication request containing the image data of the document acquired in step S41, and the process proceeds to step S47.

In step S47, the image forming apparatus 2 transmits the generated authentication request to the server 1. Subsequently to FIG. 47, in step S48, the image forming apparatus 2 determines whether an authentication response corresponding to the transmitted authentication request has been received from the server 1.

If the image forming apparatus 2 determines that the authentication response has been received from the server 1 (YES in step S48), the process proceeds to step S49. Otherwise (NO in step S48), the process returns to step S48.

In step S49, the image forming apparatus 2 displays a screen requesting the user to pay charge for the authentication, for example.

Subsequently to step S49, in step S50, the image forming apparatus determines whether the payment of charge has been made. If the image forming apparatus 2 determines that the payment of charge has been made (YES in step S50), the process proceeds to step S51. Otherwise (NO in step S50), the process returns to step S49.

In step S51, the image forming apparatus 2 determines whether the authentication result is to be printed out. If the image forming apparatus 2 determines that the authentication result is to be printed out (YES in step S51), the process proceeds to step S53. Otherwise (NO in step S51), the process proceeds to step S52.

In step S52, the image forming apparatus 2 displays the authentication result contained in the authentication response received from the server 1 on the touch panel (see FIG. 10, for example). On the other hand, in step S53, the image forming apparatus 2 prints the authentication result contained in the authentication response received from the server 1 (see FIG. 11, for example).

According to the arrangements as shown in FIG. 14, the image forming apparatus 2 can read a document, request the authentication of the document to the server 1, receive a response containing the result of the authentication from the server 1, and present the result of the authentication to the user.

Additionally, the image forming apparatus 2 can receive the payment of the charge for the authentication using the coin rack, for example, through which the user makes the payment of charges for normal image forming such as printing and duplicating of a document.

As described above, according to the first embodiment, the image forming apparatus can issue a document that can be efficiently authenticated. Since the items to be verified in the document are stored at a memory location that can be identified using a URI, the document can be efficiently authenticated. As described above, the verification information may not included in the document.

Second Embodiment

According to the first embodiment described above, the authentication of a document is performed by the server 1. However, the authentication of a document may be performed by the image forming apparatus 2. In the following description, the difference between the first and second embodiments is mainly described in detail.

Figure 15:
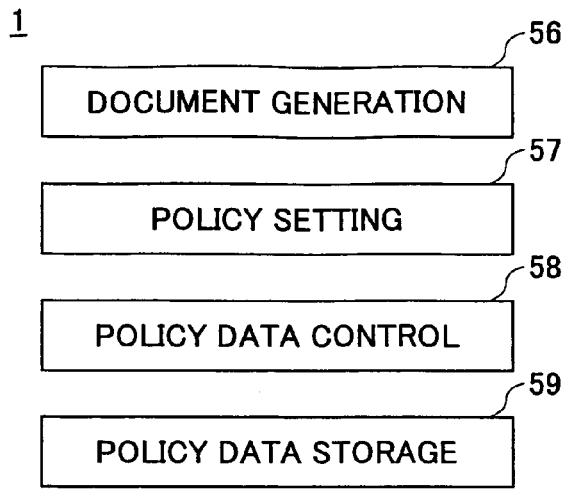
FIG. 15 illustrates the function of the server according to another embodiment.

The functional structure of the server 1 according to the second embodiment is shown in FIG. 15.

As shown in FIG. 15, the server 1 includes a document generation unit 56, a policy setting unit 57, a policy data control unit 58, and a policy data storage unit 59.

The document generation unit 56 generates a document such as one shown in FIG. 9. The policy setting unit 57 sets the policy for each type of document in dependence to the request from an administrator of the server. The policy data control unit 58 controls data related to the policy stored in the policy data storage unit 59. For example, the policy data control unit 58 stores the policy in the policy data storage unit 59 in response to a request from the policy setting unit 57, and retrieve data related to the policy from the policy data storage unit 59 in response to a request from the document generation unit 56. The policy data storage unit 59 stores data related to the policy.

As shown in FIG. 15, the server 1 according to the second embodiment does not need to store and control data related to the items to be verified. In the case of the second embodiment, the server 1 and the image forming apparatus 2 communicate to ensure the same data related to the policy is stored in the policy data storage unit 59.

Figure 16:
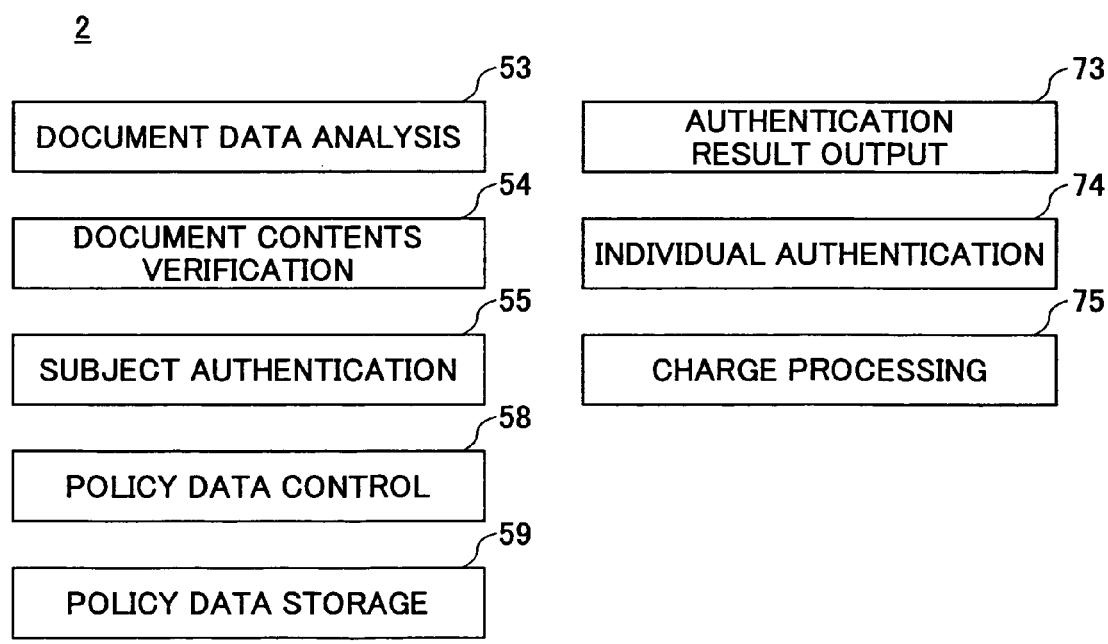
FIG. 16 illustrates the function of the image forming apparatus according to another embodiment.

The functional structure of the image forming apparatus 2 according to the second embodiment is shown in FIG. 16. As shown in FIG. 16, the image forming apparatus includes a document data analysis unit 53, a document contents verification unit 54, a subject authentication unit 55, a policy data control unit 58, a policy data storage unit 59, an authentication result output unit 73, an individual authentication unit 74, and a charge processing unit 75.

The document data analysis unit 53 analyzes the image data of the document. For example, the document data analysis unit 53 according to the second embodiment identifies URI from the image data of the document, and identifies a policy stored in the policy data storage unit 59 by accessing a memory location identified by the URI. The document data analysis unit 53 further identifies items to be verified in the image data of the document and digitization to be performed on the data of the items to be verified, and digitizes the data of the items to be verified. The document data analysis unit 53 according to the second embodiment further identifies verification data (to be described below) from the image data of the document based on the policy (or data related to the policy).

The document contents verification unit 54 verifies the contents of the document thereby to authenticate the document. For example, the document contents verification unit 54 according to the second embodiment compares the digitized data by the document data analysis unit 53 and the verification information identified by the document data analysis unit 53 thereby to authenticate the document.

The subject authentication unit 55 determines whether the person requesting for the authentication is identical to the subject person written on the document. The policy data control unit 58 controls data related to policies stored in the policy data storage unit 59. For example, the policy data control unit 58 retrieves data related to a policy from the policy data storage unit 59 in response to a request from the document data analysis unit 53, and provides the retrieved data to the document data analysis unit 53. The policy data storage unit 59 stores the data related to policies.

The authentication result output unit 73 outputs the authentication result to the touch panel of the image forming apparatus 2 or prints the authentication result, for example.

The individual authentication unit 74 requests the user to input personal data for the authentication. The charge processing unit 75 requests the user to pay the charge for the authentication, and determines whether the payment of the charge for the authentication has been made to the coin rack provided to the image forming apparatus 2, for example.

Figure 17:
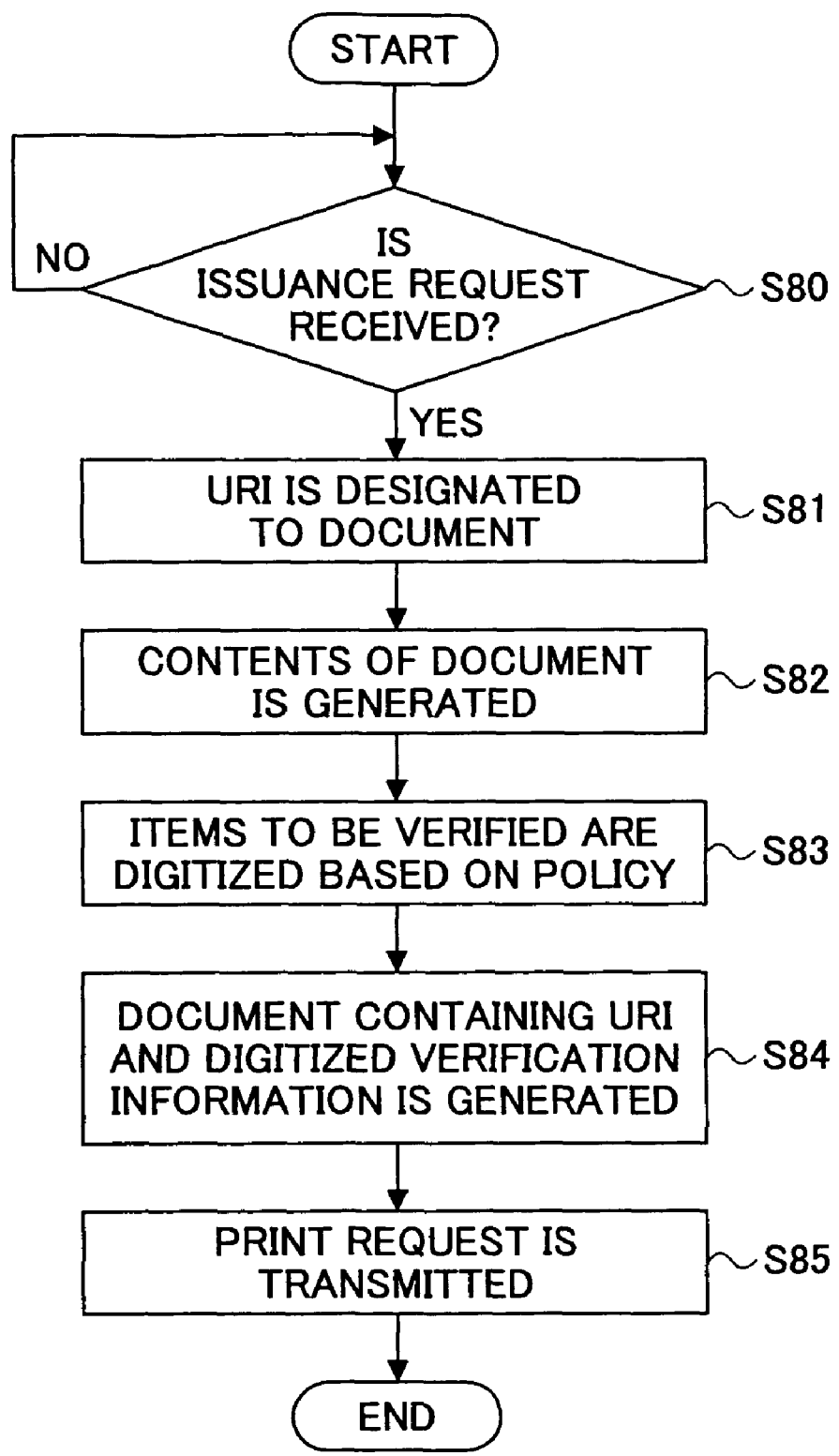
FIG. 17 is a flowchart showing the issuance of a document by the server according to another embodiment.

Another example of the issuance of a document by the server 1 is described with reference to FIG. 17. FIG. 17 is a second flowchart showing the issuance of a document by the server 1.

In step S80, the server 1 determines whether a request for the issuance of a document has been received. If the server 1 determines that a request for the issuance of a document has been received from a user, for example (YES in step S80), the process proceeds to step S81, otherwise (NO in step S80), returns to step S80.

In step S81, the server designates a URI to the document. Subsequent to step S81, in step S82, the server 1 generates the contents of the document in dependence on the type of the document.

Subsequently to step S82, in step S83, the server 1 digitizes data of the items to be verified (verification information) in accordance with the policy set for each type of document.

Subsequently to step S83, in step S84, the server 1 generates the document in which the URI designated in step S81 and the verification information digitized in step S83 are embedded.

Subsequently to step S84, in step S85, the server 1 transmits a request for printing the document generated in step S84 to the printer 3, for example.

According to the above arrangements as shown in FIG. 12, the image forming apparatus 2 can generate and print a document, and provide the printed document to the user. As described above, according to the second embodiment, the data of the items to be verified does not need to be retained by the server.

Figure 18:
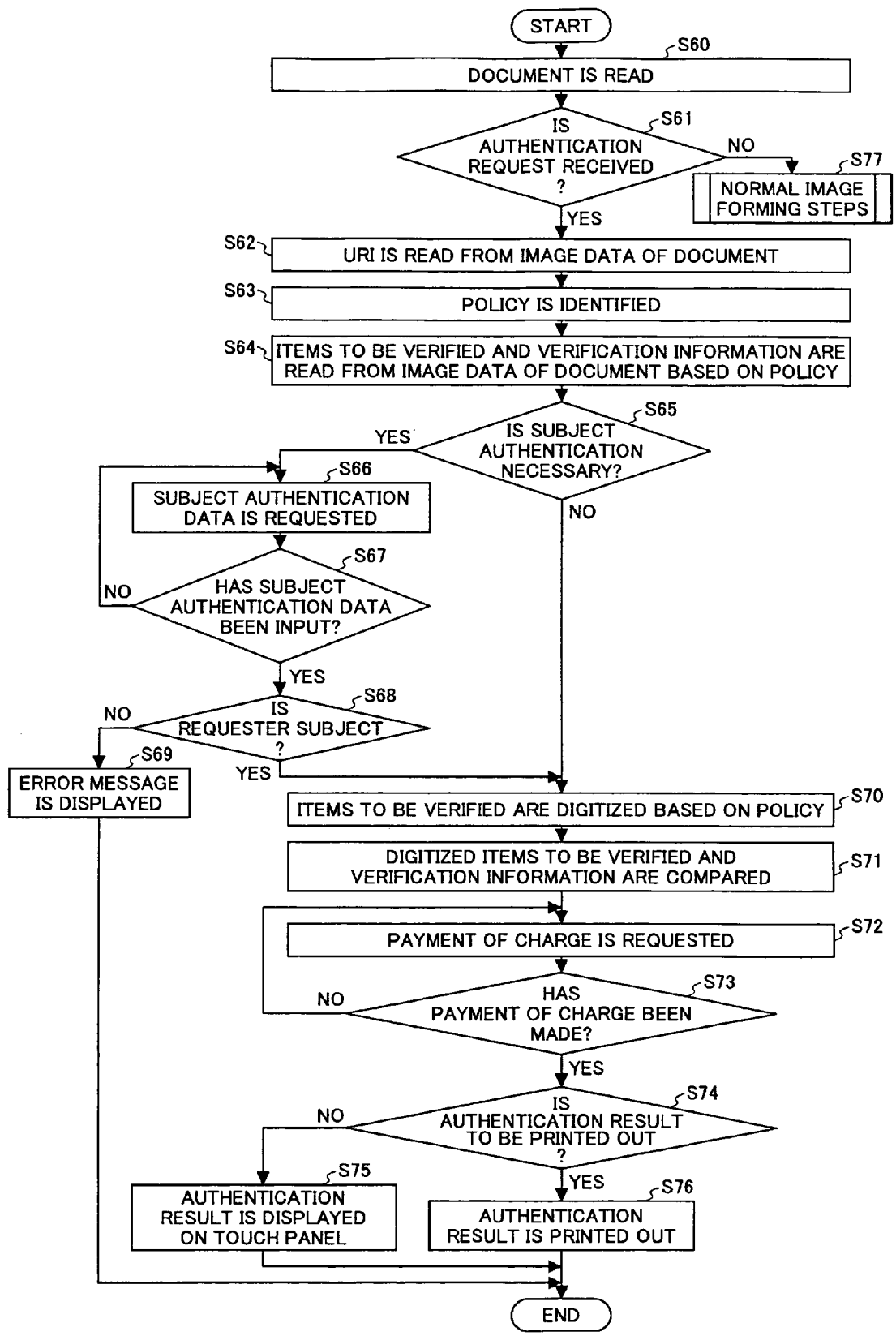
FIG. 18 is a flowchart showing the authentication of a document by the image forming apparatus according to another embodiment.

Another example of authentication by the image forming apparatus 2 is shown in FIG. 18. FIG. 18 is a second flowchart showing the authentication by the image forming apparatus.

In step S60, the image forming apparatus 2 reads the document set on the input/output unit 29, and acquires the image data of the document. Subsequently to step S60, in step S61, the image forming apparatus 2 determines whether an authentication request has been received from a user, for example. If the image forming apparatus 2 determines that an authentication request has been received (YES in step S61), the process proceeds to step S62. Otherwise (NO in step S61), the process proceeds to step S77.

If the image forming apparatus 2 determines that the user has pressed a button for requesting the authentication of the document set on the input/display unit 21 before the start button is pressed, the image forming apparatus 2 determines that the authentication of the document has been requested. Otherwise (NO in step S61), the image forming apparatus 2 performs normal image forming such that the document set in the input/output apparatus 29 is read and duplicated, for example in step S77.

On the other hand, in step S62, the image forming apparatus 2 identifies the URI of the document from the image data acquired in step S61.

Subsequently to step S62, in step S63, the image forming apparatus 2 retrieves and identifies the policy from the policy data storage unit 59 based on the URI identified in step S62.

Subsequently to step S63, in step S64, the image forming apparatus 2 identifies the items to be verified and verification information from the image data acquired in step S61.

Subsequently to step S64, in step S65, the image forming apparatus 2 determines whether the subject authentication is necessary. If the image forming apparatus 2 determines that the subject authentication is necessary (YES in step S65), the process proceeds to step S66. Otherwise (NO in step S65), the process proceeds to step S70.

In step S66, the image forming apparatus 2 requests the user to input data required for the subject authentication. For example, the image forming apparatus 2 displays a screen on the touch panel for requesting the input of user name and a password thereby to request the user to input the user name and the password. The image forming apparatus 2 may display a screen on the touch panel for requesting the insertion of an IC card in which the individual authentication data is stored thereby to request the user for the insertion of the IC card.

Subsequently to step S66, in step S67, the image forming apparatus 2 determines whether the individual authentication data has been input or not. If the image forming apparatus 2 determines that the individual authentication data has been input (YES in step S67), the process proceeds to step S68. Otherwise (NO in step S67), the process proceeds to step S66.

In step S68, the image forming apparatus 2 compares the individual authentication data acquired in step S67 with the name contained in the image data acquired in step S61 thereby to determine whether the person requesting for the authentication is the subject of the document. If the image forming apparatus 2 determines that the requesting person is the subject (YES in step S68), the process proceeds to step S70. Otherwise (NO in step S68), the process proceeds to step S69.

In step S69, the image forming apparatus 2 displays a message that the subject authentication has failed on the touch panel, and the process is terminated. On the other hand, in step S70, the image forming apparatus 2 digitizes the data of the items to be verified in accordance with the policy identified in step S63.

Subsequently to step S70, in step S71, the image forming apparatus 2 compares the data of the items to be verified digitized in step S70 with the verification information read in step S64.

Subsequently to step S71, in step S72, the image forming apparatus 2 displays a screen requesting the user to pay charge for the authentication, for example.

Subsequently to step S72, in step S73, the image forming apparatus determines whether the payment of charge has been made. If the image forming apparatus 2 determines that the payment of charge has been made (YES in step S73), the process proceeds to step S74. Otherwise (NO in step S73), the process returns to step S72.

In step S74, the image forming apparatus 2 determines whether the authentication result is to be printed out. If the image forming apparatus 2 determines that the authentication result is to be printed out (YES in step S74), the process proceeds to step S76. Otherwise (NO in step S74), the process proceeds to step S75.

In step S75, the image forming apparatus 2 displays the authentication result contained in the authentication response received from the server 1 on the touch panel (see FIG. 10 of the first embodiment, for example). On the other hand, in step S76, the image forming apparatus 2 prints the authentication result contained in the authentication response received from the server 1 (see FIG. 11 of the first embodiment, for example).

According to the arrangements as shown in FIG. 18, the image forming apparatus 2 can authenticate the document by itself.

Additionally, the image forming apparatus 2 can receive the payment of the charge for the authentication using the coin rack, for example, through which the user makes the payment of charges for normal image forming such as printing and duplicating of a document.

As described above, according to the second embodiment, the image forming apparatus can issue a document that can be efficiently authenticated. Since the verification information is embedded in the document, the document can be efficiently authenticated without storing the issuance record of the document in the server 1.

Third Embodiment

Figure 19:
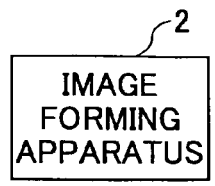
FIG. 19 is illustrates a system according to another embodiment.

Another example of a system according to a third embodiment is shown in FIG. 19. FIG. 19 illustrates the system according to the third embodiment. In the above embodiments, the document is generated by the server 1 and output by the printer 3. According to the third embodiment, the image forming apparatus 2 generates and prints a document as well as the authentication of the document.

Figure 20:
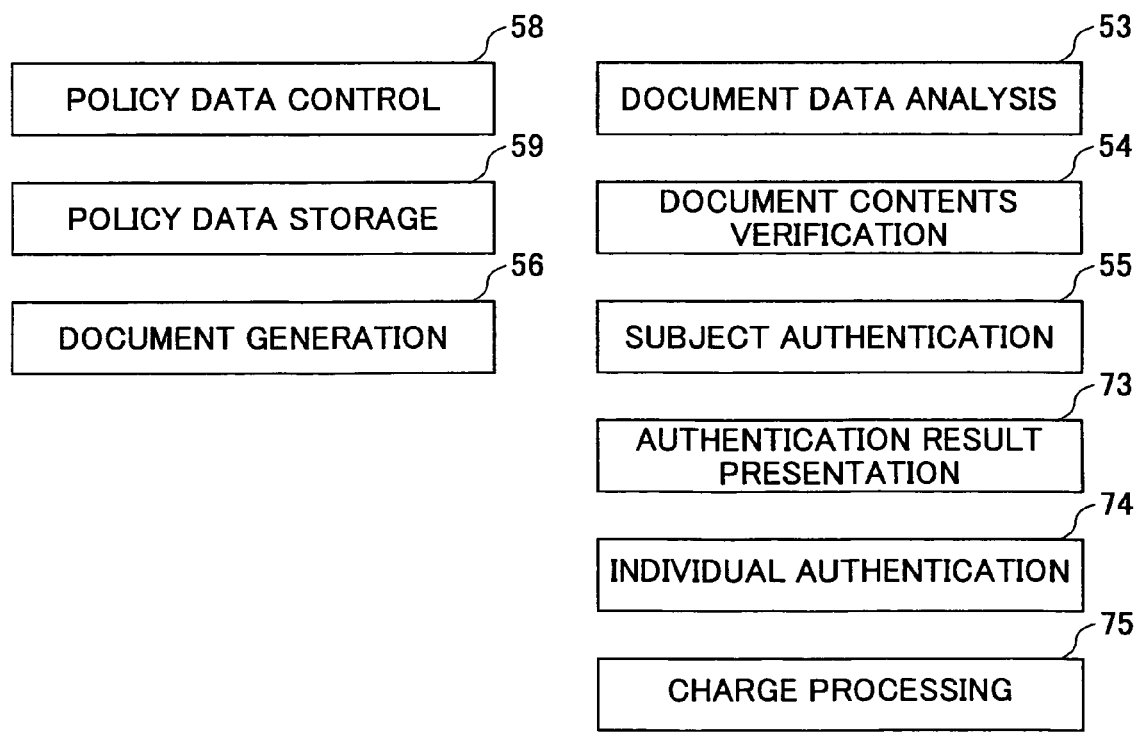
FIG. 20 illustrates the function of the image forming apparatus according to an embodiment.

The functional structure of the image forming apparatus 2 according to the third embodiment is shown in FIG. 20. FIG. 20 illustrates the functional structure of the image forming apparatus 2. As shown in FIG. 20, the image forming apparatus 2 includes a policy data control unit 58, a policy data storage unit 59, a document generation unit 56, a document data analysis unit 53, a document contents verification unit 54, a subject authentication unit 55, an authentication result presentation unit 73, an individual authentication unit 74, and a charge processing unit 75.

The policy data control unit 58 controls data related to the policy stored in the policy data storage unit 59. For example, the policy data control unit 58 retrieves data related to the policy from the policy data storage unit 59 in response to a request from the document generation unit 56 or the document data analysis unit 53, and provides the retrieved data to the document generation unit 56 or the document data analysis unit 53.

The policy data storage unit 59 stores data related to policies. In the case of the third embodiment, it is assumed that the data related to policies is set in the image forming apparatus. Even in the case of the third embodiment, the image forming apparatus 2 may have the function of the policy setting unit 57 such that the data related to policies is stored in the policy data storage unit 59 via the policy data control unit 58. In the following description, however, an assumption is made for simplicity that the image forming apparatus 2 does not have the function of the policy setting unit 57.

The document generation unit 56 generates a document as described above with reference to FIG. 9. The document data analysis unit 53 analyzes the image data of a document. For example, the document data analysis unit 53 according to the third embodiment identifies the URI from the image data of the document, and identifies the policy corresponding to the URI from the policy data storage unit 59. The document data analysis unit 53 further identifies the items to be verified and digitization for each item from the image data of the document based on the policy, and digitizes data of the items to be verified. The document data analysis unit 53 according to the third embodiment reads the verification information from the image data of the document based on the policy.

The document contents verification unit 54 verifies the contents of the document thereby to authenticate the document. For example, the document contents verification unit 54 compares the digitized data and the verification information for the authentication of the document. The subject authentication unit 55 determines whether the person requesting for the authentication is identical to the person whose name is written on the document.

The individual authentication unit 74 requests the user to input personal data for the authentication. The authentication result output unit 73 outputs the authentication result to the touch panel of the image forming apparatus 2 or prints the authentication result, for example. The charge processing unit 75 requests the user to pay the charge for the authentication, and determines whether the payment of the charge for the authentication has been made to the coin rack provided to the image forming apparatus 2, for example.

Figure 21:
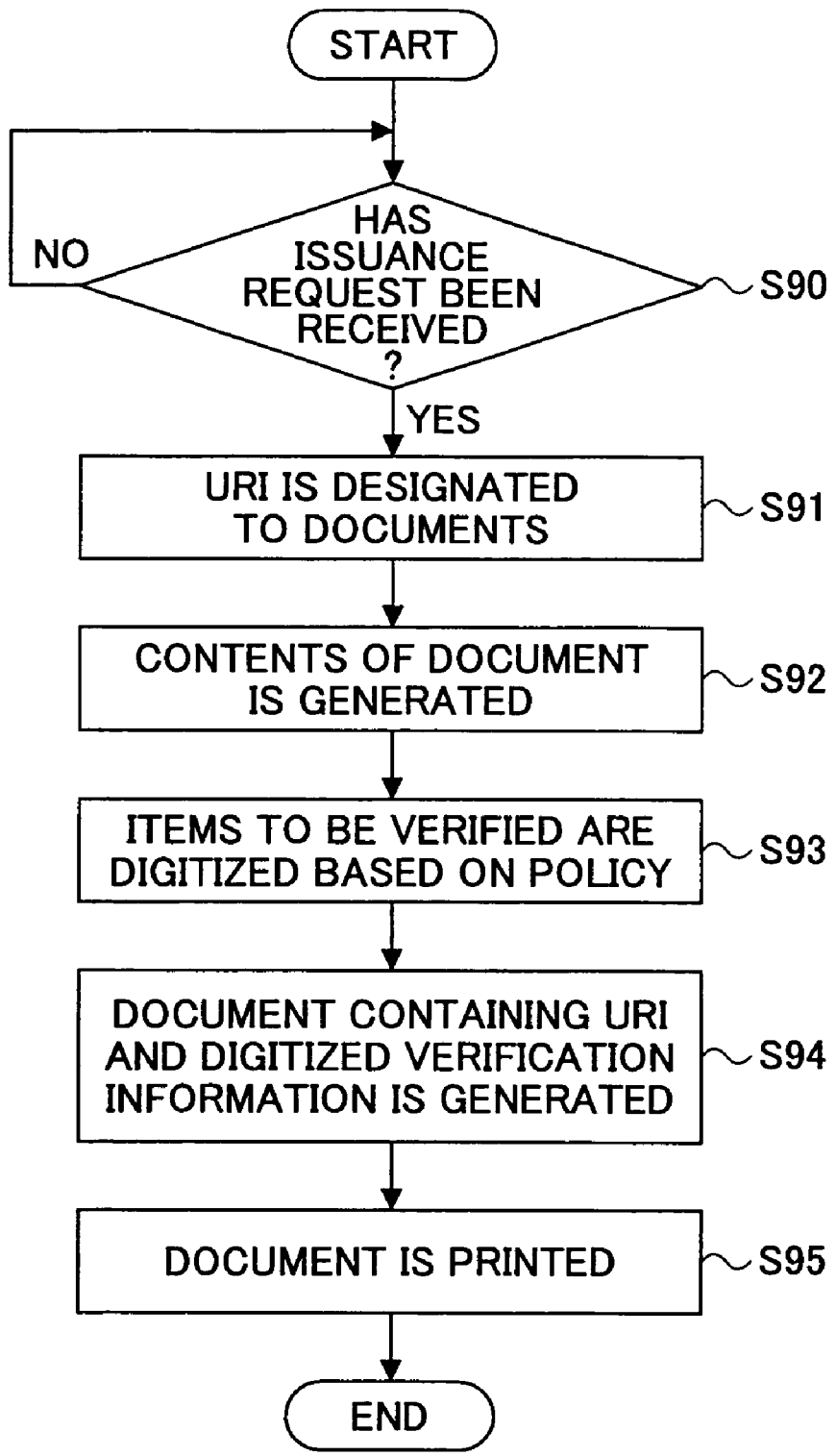
FIG. 21 is a flowchart showing the issuance of a document by the image forming apparatus according to another embodiment.

The issuance of a document by the image forming apparatus according to the third embodiment is described with reference to FIG. 21. FIG. 21 is a flowchart showing an exemplary operation of the image forming apparatus 2 in which a document is issued.

In step S90, the image forming apparatus 2 determines whether a request for the issuance of a document has been received. If the image forming apparatus 2 determines that a request for the issuance of a document has been received from a user, for example (YES in step S90), the process proceeds to step S91, otherwise (NO in step S90), returns to step S90.

In step S91, the image forming apparatus 2 designates a URI to the document. Subsequent to step S91, in step S92, the image forming apparatus 2 generates the contents of the document in dependence on the type of the document. In the case of the certificate of real estate value shown in FIG. 9, the contents of the document may include the name and address of the owner, and the location and value of the owner's real estate.

Subsequently to step S92, in step S93, the image forming apparatus 2 digitizes data of the items to be verified (verification information) in accordance with the policy set for each type of document.

Subsequently to step S93, in step S94, the image forming apparatus 2 generates the document in which the URI designated in step S91 and the verification information digitized in step S93 are embedded.

Subsequently to step S94, in step S95, the image forming apparatus 2 prints the document generated in step S94.

Following the process as shown in FIG. 21, the image forming apparatus 2 can generate, print, and present the document described with reference to FIG. 9.

Since the authentication process of the image forming apparatus 2 according to the third embodiment is the same as that of the second embodiment described above with reference to FIG. 18, the description of the authentication process of the image forming apparatus 2 according to the third embodiment is omitted.

As described above, according to the third embodiment, the image forming apparatus 2 can issue a document that can be efficiently authenticated. Since the verification information is embedded in the document, the document can be efficiently authenticated without storing the issuance record of the document in the image forming apparatus 2.

The preferred embodiments of the present invention are described above. The present invention is not limited to these embodiments, but variations and modifications may be made without departing from the scope of the present invention.

For example, in the case of the first embodiment, that is, in the case in which the server 1 verifies the contents of the document and authenticates the document, the server 1 can compare the verification information and the digitized data of the items to be verified as described with respect to the second embodiment. In such a case, the server 1 does not need to control data of the items to be verified.

According to the second embodiment, it is described that the policy setting unit 57 provided in the server 1 sets policies. However, the policy setting unit 57 does not need to be provided in the server 1 if policy data is stored in the policy data storage unit 59 in advance.

The present invention provides the efficient authentication of documents in accordance with a policy. In addition, the present invention provides the generation of documents that can be efficiently authenticated in accordance with a policy.

This patent application is based on Japanese priority patent applications No. 2004-114372 filed on Apr. 8, 2004, and No. 2005-102855 filed on Mar. 31, 2005, the entire contents of which are hereby incorporated by reference.

What is claimed is:

1. An image processing apparatus for authenticating a document, comprising:
   a document data acquisition unit configured to read a document to acquire a uniform resource identifier designated to and embedded in the document by a document generating unit, one or more data items printed on the document, and verification information embedded in the document;
   a document data analysis unit configured to identify policy data based on the acquired uniform resource identifier, and to perform a specified conversion method on the one or more data items to obtain a conversion result;
   a policy data control unit configured to retrieve the identified policy data from a policy data storage unit, the identified policy data indicating at least (1) the specified conversion method which indicates how the verification information was generated and (2) where the verification information is embedded in the document; and
   an authentication unit configured to authenticate the document by comparing the conversion result and the acquired verification information;
   wherein the verification information embedded in the document has been generated by the document generating unit which has generated the document by performing the specified conversion method on the one or more data items printed on the document.

2. The image processing apparatus as claimed in claim 1, further comprising:
   an authentication result presentation unit configured to present the result of the authentication by the authentication unit.

3. The image processing apparatus as claimed in claim 2, wherein the authentication result presentation unit is configured to present the result of the authentication on a display unit of the image processing apparatus.

4. The image processing apparatus as claimed in claim 2, wherein the authentication result presentation unit is configured to print the result of the authentication.

5. The image processing apparatus as claimed in claim 1, further comprising:
a policy data storage unit configured to store policy data for each data item of information related to the document and the uniform resource identifier of the document.

6. In an image forming apparatus, a method of authenticating a document, the method comprising:
reading a document to acquire document information including a uniform resource identifier designated to and embedded in the document by a document generating unit, one or more data items printed on the document, and verification information embedded in the document;
identifying policy data based on the acquired uniform resource identifier;
retrieving the identified policy data, the identified policy data indicating at least (1) a specified conversion method which indicates how the verification information was generated and (2) where the verification information is embedded in the document;
converting, using the specified conversion method, the one or more data items to obtain a conversion result; and
authenticating the document by comparing the conversion result and the acquired verification information,
wherein the verification information embedded in the document has been generated by the document generating unit which has generated the document by performing the specified conversion method on the one or more data items printed on the document.

7. The method as claimed in claim 6, further comprising:
storing the policy data for the document; and
generating the document containing verification information by generating the verification information based on the stored policy data.

8. The method as claimed in claim 6, further comprising:
setting the policy data for the document;
generating the document; and
storing the one or more data items to be verified used for the generation of the document for each document and the uniform resource identifier of the document.

9. A system for generating a document, comprising:
a policy setting unit configured to set policy data for the document and/or type of the document;
a policy data storage unit configured to store the policy data for the document and/or type of the document, the policy data indicating at least (1) a specified conversion method which indicates how verification information is generated from one or more data items to be printed on the document and (2) where the verification information is embedded in the document;
a document generation unit configured to generate the document containing the verification information, the verification information being generated by performing the specified conversion method on the one or more data items; and
a print unit configured to print the generated document including the one or more data items, the generated verification information and a uniform resource identifier which identifies the policy data, the uniform resource identifier designated to and embedded in the document by the document generating unit.

10. The method as claimed in claim 6, further comprising:
storing the document information onto an electronic memory of the image forming apparatus after the reading.

11. The method as claimed in claim 6, wherein the identifying, converting and authenticating comprise utilizing a processor of the image forming apparatus.

12. The system according to claim 9, further comprising:
an individual authentication unit configured to authenticate a user requesting generation of the document; and
a charge processing unit to accept a payment from the user requesting generation of the document, wherein
the print unit prints the generated document based on a determination that the user is authenticated by the individual authentication unit and the charge processing unit has accepted the payment.

13. The system according to claim 12, wherein the individual authentication unit authenticates the user based on personal information input by the user and by comparing a name of the user with a name included in the generated document.

* * * * *